United States Patent [19]
Ishida et al.

[11] Patent Number: 5,998,094
[45] Date of Patent: *Dec. 7, 1999

[54] OPTICAL INFORMATION RECORDING MEDIUM

[75] Inventors: Toshio Ishida; Michihiro Shibata; Koji Wariishi; Shinichi Morishima, all of Kanagawa, Japan

[73] Assignee: Fuji Photo Film Co., Ltd., Kanagawa, Japan

[*] Notice: This patent is subject to a terminal disclaimer.

[21] Appl. No.: 09/026,610

[22] Filed: Feb. 20, 1998

[30] Foreign Application Priority Data

Feb. 21, 1997 [JP] Japan ................................... 9-054203

[51] Int. Cl.⁶ ....................................................... G11B 7/24
[52] U.S. Cl. ................. 430/270.19; 430/945; 430/270.2; 430/270.21
[58] Field of Search ............................... 430/945, 270.19, 430/270.2, 270.21; 522/303

[56] References Cited

U.S. PATENT DOCUMENTS

| | | | |
|---|---|---|---|
| 3,687,987 | 8/1972 | Martin | 552/303 |
| 5,182,186 | 1/1993 | Inagaki et al. | 430/945 |
| 5,579,150 | 11/1996 | Cho et al. | 430/270.19 |
| 5,879,772 | 3/1999 | Morishima et al. | 430/945 |

*Primary Examiner*—Martin Angebranndt
*Attorney, Agent, or Firm*—Sughrue, Mion, Zinn Macpeak & Seas, PLLC

[57] ABSTRACT

A light-resistant recording layer of an optical information recording medium composed of a cyanine dye compound having the formula (I):

$$[DYE^+]_n X^{n-} \qquad (I)$$

in which $DYE^+$ is a monovalent cyanine dye cation, n is an integer of 2 or more, and $X^{n+}$ is an n-valent anion, and a compound having the following formula (A1) or (A2):

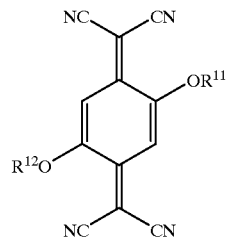

A1

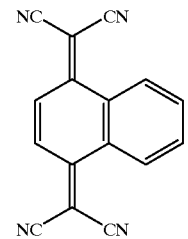

A2 in which each of $R^{11}$ and $R^{12}$ is a hydrocarbon group.

10 Claims, No Drawings

OPTICAL INFORMATION RECORDING MEDIUM

FIELD OF THE INVENTION

This invention relates to an optical information recording medium of heat mode type on which information can be recorded by means of a laser beam.

BACKGROUND OF THE INVENTION

An information recording medium on which information can be only once recorded by means of a laser beam is known as a recordable compact disc (CD-R), and has been getting widely used because it can be produced on a relatively small scale and at a low cost, as compared with a conventional compact disc (CD).

The optical disc of CD-R type generally has a multi-layer structure typically comprising a disc-shaped transparent substrate (support), a recording layer comprising an organic dye, a light-reflecting layer made of a metal such as gold, and a protective layer made of a resin overlaid in order. The information can be recorded by irradiating the disc with a laser beam of a near infrared region (usually around 780 nm). By the irradiation with the laser beam, the irradiated area of recording layer is locally heated to change the physical or chemical characteristics, and thus pits are formed in the recording layer. Since the optical characteristics of the formed pits differ from those of the area having been not irradiated, the information is recorded. The recorded information can be read by the reproducing procedure comprising the steps of: irradiating the recording layer with the laser beam having the same wavelength as that of the laser beam employed in the recording procedure, and detecting the light-reflection difference between the pits and the other area.

The above CD-R having a recording dye layer is desired to keep a high light-resistance after recording, as well as high information reproductivity and such a high light-reflection that the information can be reproduced by means of a commercially available CD player. As described above, CD-R has been getting widely used in these days, and accordingly it is often used under severe conditions (such as extreme fluctuation of ambient temperature and/or humidity). Therefore, the light-resistance of CD-R is now very important subject.

As a dye compound for the recording layer, a cyanine dye having a benzoindolenine structure (in which a benzene ring is fused with the indolenine skeleton) is advantageously used, as is described in Japanese Patent Provisional Publications No. 64-40382 and No. 64-40387. In combination with the above-mentioned cyanine dye, various singlet oxygen quenchers are generally employed as an anti-fading agent so as to improve the light-resistance of the recording dye layer. For example, nitroso compounds (Japanese Patent Provisional Publication No. H2-300288) and nickel complexes (Japanese Patent Provisional Publication No. H4-146189) are well-known singlet oxygen quenchers. Besides them, electron accepting compounds such as tetra-cyanoquinodimethane (TCNQ) are proposed to effectively enhance the light-resistance of the recording layer containing the above cyanine dye (Japanese Patent Provisional Publication No. 63-64794).

According to studies by the inventors of the present invention, however, the above singlet oxygen quenchers and the electron accepting compounds may not give a satisfactory light-resistance to the recording layer containing the cyanine dye.

In Japanese Patent Provisional Publication No. H4-175188, a cyanine dye preferably employed for CD-R is proposed. According to the publication, the proposed dye has a light-reflection higher than that of the dye described in Japanese Patent Provisional Publication No. 64-40382, and also it exhibits a high light-resistance in the presence of the conventional anti-fading agents. However, although the publication says that the dye can have an anion of 1 to 3 valence, concrete examples of the dye having only a monovalent anion are disclosed, and there is no description about those of the dye having a di- or tri-valent anion.

It is an object of the present invention to provide an optical information recording medium having an improved light-resistance after recording. Particularly, it is an object of the invention to provide an optical information recording medium which keeps a high light-resistance during its storing under severe conditions such as a high temperature, a high humidity and an extreme fluctuation of temperature and/or humidity.

SUMMARY OF THE INVENTION

The inventors have found that the light-resistance of the optical information recording medium can be remarkably improved by using a combination of a specific anti-fading agent and a cyanine dye consisting of a polyvalent anion and two or more cyanine dye cations. Although the mechanism causing the above effect is not elucidated, it is assumed that the polyvalent anion makes the dye anions work as counter ions to enhance electric or structural interaction between the dye and the anti-fading agent.

The present invention resides in an optical information recording medium of the heat mode type which comprises a substrate, a recording layer on which information is recordable by irradiation with a laser beam, and a light-reflecting layer overlaid in order, wherein said recording layer comprises:

a cyanine dye compound having the following formula (I):

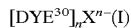

$$[DYE^+]_n X^{n-} \quad (I)$$

in which DYE$^+$ represents a monovalent cyanine dye cation, n represents an integer of 2 or more, and X$^{n-}$ represents an n-valent anion; and a compound having the following formula (A1) or (A2):

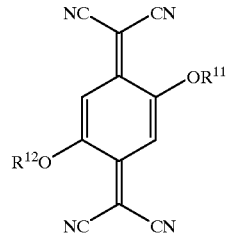

A1

-continued

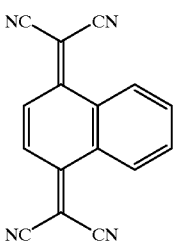

A2 in which each of R¹¹ and R¹² independently represents a hydrocarbon group.

The preferred embodiments of the invention are given below.

(1) The cyanine dye compound has the following formula (II):

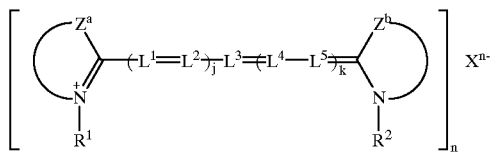

(II)

in which each of Za and Zb independently represents an atomic group required for forming a 5- or 6-membered nitrogen-containing heterocyclic ring; each of R¹ and R² independently represents an alkyl group or an aryl group; each of L¹, L², L³, L⁴ and L⁵ independently represents a methine group which may have a substituent group, and in the case that L¹ to L⁵ have a substituent group, it may be combined with each other to form a ring; j represents an integer of 0, 1 or 2; k represents an integer of 0 or 1; $X^{n-}$ represents an n-valent anion; and n represents an integer of 2 or more.

(2) The cyanine dye compound has the following formula (IIA):

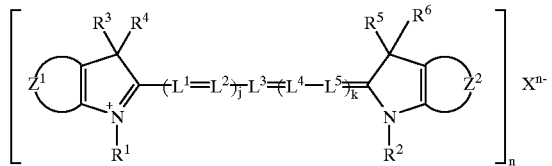

(IIA)

in which each of Z¹ and Z² independently represents an atomic group required for forming an indolenine nucleus or a benzoindolenine nucleus; each of R¹ and R² independently represents an alkyl group or an aryl group; each of R³, R⁴, R⁵ and R⁶ independently represents an alkyl group; each of L¹, L², L³, L⁴ and L⁵ independently represents a methine group which may have a substituent group, and in the case that L¹ to L⁵ have a substituent group, it may be combined with each other to form a ring; j represents an integer of 0, 1 or 2; k represents an integer of 0 or 1; $X^{n-}$ represents an n-valent anion; and n represents an integer of 2 or more.

(3) n represents an integer of 2 to 4 (preferably 2 to 3, and more preferably 2).

(4) In the formula (II) or (IIA), j is 2 and k is 2, or both of j and k are 1.

(5) In the formula (II) or (IIA), $X^{2-}$ is benzene-1,3-disulfonate ion, 3,3'-biphenyldisulfonate ion, naphthalene-1,5-disulfonate ion, naphthalene-1,6-disulfonate ion, naphthalene-2,6-disulfonate ion, 1-methylnaphthalene-2,6-disulfonate ion, naphthalene-2,7-disulfonate ion, naphthalene-2,8-disulfonate ion, 2-naphthol-6,8-disulfonate ion, 1,8-dihydroxynaphthalene-3,6-disulfonate ion, or 1,5-dihydroxynaphthalene-2,6-disulfonate ion.

(6) In the formula (II) or (IIA), $X^{2-}$ is naphthalene-1,5-disulfonate ion, naphthalene-1,6-disulfonate ion, 1-methylnaphthalene-2,6-disulfonate ion, naphthalene-2,7-disulfonate ion, or naphthalene-2,8-disulfonate ion.

(7) In the formula (II) or (IIA), $X^{2-}$ is naphthalene-1,5-disulfonate ion.

(8) In the formula (A2), each of R¹¹ and R¹² independently represents an alkyl group having 1–10 (preferably 1–8, more preferably 1–6, and further preferably 1–4) carbon atoms. The alkyl group may be of a straight chain or a branched chain.

DETAILS DESCRIPTION OF THE INVENTION

The optical information recording medium of the invention is characterized by having a recording layer containing a cyanine dye compound of the formula (I) and a compound of the formula (A1) or (A2).

The following is a detailed description about the cyanine dye compound having the following formula (I):

$$[DYE^-]_rX^{n-} \tag{I}$$

in which DYE⁺ represents a monovalent cyanine dye cation having no anionic substituent, $X^{n-}$ represents an n-valent anion, and n represents an integer not less than 2 (namely, $X^{n-}$ represents an anion having the valence of not less than 2).

The polyvalent anion represented by $X^{n-}$ may be an inorganic anion or an organic anion. Examples of the polyvalent inorganic anions include sulfate ion, phosphate ion, hydrogenphosphate ion, and heteropoly-acidic ion such as phosphorus wolframate ion. Examples of the polyvalent organic anions include carboxylate ions (e.g., succinate ion, maleate ion, fumarate ion, terephthalate ion), aromatic disulfonate ions (e.g., benzene-1,3-di-sulfonate ion, 3,3'-biphenyldisulfonate ion, naphthalene-1,5-disulfonate ion, naphthalene-1,6-disulfonate ion, naphthalene-2,6-disulfonate ion, 1-methylnaphthalene-2,6-disulfonate ion, naphthalene-2,7-disulfonate ion, naphthalene-2,8-disulfonate ion, 2-naphthol-6,8-disulfonate ion, 1,8-dihydroxynaphthalene-3,6-disulfonate ion, 1,5-dihydroxynaphthalene-2,6-disulfonate ion), aromatic trisulfonate ions (e.g., naphthalene-1,3,5-trisulfonate ion, naphthalene-1,3,6-trisulfonate ion, naphthalene-1,3,7-trisulfonate ion, 1-naphthol-3,6,8-trisulfonate ion, 2-naphthol-3,6,8-trisulfonate ion), aromatic tetrasulfonate ions (e.g., naphthalene-1,3,5-tetrasulfonate ion), aliphatic polysulfonate ions (e.g., butane-1,4-disulfonate ion, cyclohexane-1,4-disulfonate ion), and polysulfuric monoesters (e.g., propylene glycol-1,2-disulfate, polyvinyl alcohol polysulfate ester ions). In the above formula, $X^{n-}$ preferably is an anion having 2-4 valence, more preferably an anion having 2 or 3 valence, and further preferably a divalent anion.

The cyanine dye compound preferably employed for the invention has the following formula (II):

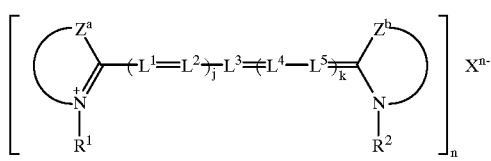

in which each of Za and Zb independently represents an atomic group necessary for forming a 5- or 6-membered nitrogen-containing heterocyclic ring; each of $R^1$ and $R^2$ independently represents an alkyl group or an aryl group; each of $L^1$, $L^2$, $L^3$, $L^4$ and $L^5$ independently represents a methine group which may have substituent groups, and in the case that $L^1$–$L^5$ have a substituent group, it may be combined with each other to form a ring; j represents an integer of 0, 1 or 2; k represents an integer of 0 or 1; $X^{n-}$ represents an n-valent anion, and n represents an integer of not less than 2.

Examples of the 5- or 6-membered nitrogen-containing heterocyclic rings containing the atomic group of Za or Zb include thiazole nucleus, benzothiazole nucleus, naphthothiazole nucleus, thiazoline nucleus, oxazole nucleus, benzooxazole nucleus, naphthooxazole nucleus, oxazoline nucleus, selenazole nucleus, benzoselenazole nucleus, naphthoselenazole nucleus, selenazoline nucleus, tellurazole nucleus, benzotellurazole nucleus, naphtho-tellurazole nucleus, tellurazoline nucleus, imidazole nucleus, benzoimidazole nucleus, naphthoimidazole nucleus, pyridine nucleus, quinoline nucleus, isoquinoline nucleus, imidazo(4,5-b)quinozaline nucleus, oxadiazole nucleus, thiadiazole nucleus, tetrazole nucleus, and pyrimidine nucleus. Preferred examples are benzothiazole nucleus, imidazole nucleus, naphthoimidazole nucleus, quinoline nucleus, isoquinoline nucleus, imidazo(4,5-b) quinozaline nucleus, thiadiazole nucleus, tetrazole nucleus, and pyrimidine nucleus. The above rings may be fused to the benzene ring or naphthoquinone ring.

Each of the above 5- or 6-membered nitrogen-containing heterocyclic rings may have a substituent group. Examples of the substituent groups (atoms) include a halogen atom (preferably, chlorine atom), an alkyl group (preferably, an alkyl group of a straight chain having 1–6 carbon atoms) which may have substituent groups, and an aryl group (preferably, phenyl group). Examples of the substituent groups for the alkyl group include an alkoxy group (e.g., methoxy group) and an alkylthio group (e.g., methylthio group).

The alkyl group represented by $R^1$ or $R^2$ preferably has 1–18 (more preferably 1–8, further preferably 1–6) carbon atoms and may be of a straight chain, a cyclic chain or a branched chain. The alkyl group of $R^1$ or $R^2$ may have a substituent group.

The aryl group represented by $R^1$ or $R^2$ preferably has 6–18 carbon atoms and may have a substituent group.

Examples of preferred substituent groups for the above alkyl or aryl group include an aryl group of 6–18 carbon atoms (e.g., phenyl, chlorophenyl, anisyl, toluyl, 2,4-di-t-amyl, 1-naphthyl) which may have substituent groups, an alkenyl group (e.g., vinyl, 2-methylvinyl), an alkynyl group (e.g., ethynyl, 2-methylethynyl, 2-phenylethynyl), halogen atom (e.g., F, Cl, Br, I), cyano group, hydroxyl group, carboxyl group, an acyl group (e.g., acetyl, benzoyl, salicyloyl, pivaloyl), an alkoxy group (e.g., methoxy, butoxy, cyclohexyloxy), an aryloxy group (e.g., phenoxy, 1-naphthoxy), an alkylthio group (e.g., methylthio, butylthio, benzylthio, 3-methoxypropylthio), an arylthio group (e.g., phenylthio, 4-chlorophenylthio), an alkylsulfonyl group (e.g., methanesulfonyl, butane-sulfonyl), an arylsulfonyl group (e.g., benzenesulfonyl and p-toluenesulfonyl), a carbamoyl group of 1–10 carbon atoms, an amide group of 1–10 carbon atoms, an acyloxy group of 2–10 carbon atoms, an alkoxycarbonyl group of 2–10 carbon atoms, a heterocyclic group (e. g., aromatic heterocyclic rings such as pyridyl, thienyl, furyl, thiazolyl, imidazolyl and pyrazolyl; and aliphatic heterocyclic rings such as pyrrolidine ring, piperidine ring, morpholine ring, pyran ring, thiopyran ring, dioxane ring and dithiolan ring).

Preferably, each of $R^1$ and $R^2$ independently represents a non-substituted straight chain alkyl group of 1–8 (preferably 1–6, more preferably 1–4) carbon atoms; or a straight chain alkyl group of 1–8 (preferably 1–6, more preferably 1–4) carbon atoms which is substituted with an alkoxy (preferably methoxy) group or an alkylthio (preferably methylthio) group.

The methine group represented by $L^1$–$L^5$ may have a substituent group. Examples of the substituent groups include an alkyl group of 1–18 carbon atoms, an aralkyl group, and the groups described above as substituent groups for the alkyl or aryl group of $R^1$ or $R^2$. Preferred are an alkyl group (e.g., methyl), an aryl group (e.g., phenyl), a halogen atom (e.g., Cl, Br), and an aralkyl group (e.g., benzyl). A particularly preferred substituent group is methyl.

It is preferred that j and k represent 2 and 0, respectively, or that each of j and k independently represent 0 or 1 in the formula (II) or (IIA).

The substituent groups of $L^1$–$L^5$ may be combined with each other to form a ring, which preferably is a 5- or 6-membered ring. The positions where the ring are placed depends on the length of the methine chain. If $L^1$–$L^5$ form a pentamethine chain, each of $L^1$ and $L^3$, $L^2$ and $L^4$, or $L^3$ and $L^5$ may form a ring. Further, the substituent groups may form a condensed ring. When double condensed rings are formed, $L^1$, $L^3$ and $L^5$ are connected. In that case, each set of $L^1$ and $R^1$, $L^5$ and $R^2$, and $L^3$ and $R^2$ may be combined to from a ring, which preferably is a 5- or 6-membered ring. The ring formed by the substituent groups of $L^1$–$L^5$ preferably is a cyclohexene ring.

In the formula (II), $X^{n-}$ represents an n-valent anion and n represents an integer not less than 2.

Preferably, $X^{n-}$ in the formula (II) is an aromatic disulfonate ion or an aromatic trisulfonate ion. Examples of the ions include benzene-1,3-disulfonate ion, 3,3'-biphenyldisulfonate ion, naphthalene-1,5-disulfonate ion, naphthalene-1,6-disulfonate ion, naphthalene-2,6-disulfonate ion, 1-methylnaphthalene-2,6-disulfonate ion, naphthalene-2,7-disulfonate ion, naphthalene-2,8-disulfonate ion, 2-naphthol-6,8-disulfonate ion, 1,8-dihydroxynaphthalene-3,6-disulfonate ion, and 1,5-dihydroxynaphthalene-2,6-disulfonate ion. Preferred are naphthalene-1,5-disulfonate ion, naphthalene-1,6-disulfonate ion, naphthalene-2,6-disulfonate ion, 1-methylnaphthalene-2,6-disulfonate ion, naphthalene-2,7-disulfonate ion and naphthalene-2,8-disulfonate ion. Particularly preferred is naphthalene-1,5-disulfonate ion.

The cyanine dye compound preferably employable for the invention has the following formula (IIA):

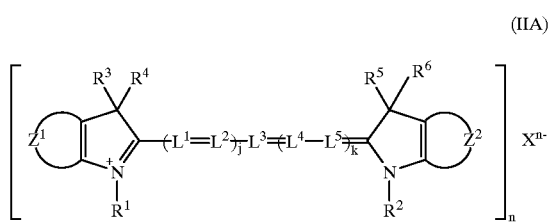

(IIA)

in which each of $Z^1$ and $Z^2$ independently represents an atomic group necessary for forming an indolenine nucleus or a benzoindolenine nucleus; each of $R^1$ and $R^2$ independently represents an alkyl group or an aryl group; each of $R^3$, $R^4$, $R^5$ and $R^6$ independently represents an alkyl group; each of $L^1$, $L^2$, $L^3$, $L^4$ and $L^5$ independently represents a methine group which may have a substituent group, and in the case that some of $L^1$–$L^5$ have a substituent group, they may be combined to form a ring; j represents an integer of 0, 1 or 2; k represents an integer of 0 or 1; $X^{n-}$ represents an n-valent anion, and n represents an integer of not less than 2.

The indolenine or benzoindolenine nucleus containing the atomic group of $Z^1$ or $Z^2$ may have a substituent group. Examples of the substituent groups (atoms) include a halogen atom (preferably, chlorine atom) and an aryl group (preferably, phenyl group).

The alkyl group represented by each of $R^3$, $R^4$, $R^5$ and $R^6$ preferably has 1–18 carbon atoms and may be of a straight chain, a cyclic chain or a branched chain. Each set of $R^3$ and $R^4$, and $R^5$ and $R^6$ may be combined to form a ring. The alkyl group of $R^3$, $R^4$, $R^5$ or $R^6$ may have a substituent group. Preferable examples of the substituent group are the same as those described above for the alkyl or aryl group of $R^1$ or $R^2$. Preferably, each of $R^3$, $R^4$, $R^5$ and $R^6$ independently represents a non-substituted straight chain alkyl group of 1-6 carbon atoms (methyl and ethyl are particularly preferred).

Each of $R^1$, $R^2$, $L_1$, $L^2$, $L^3$, $L^4$, $L^5$, j, k, $X^{n-}$, and n in the formula (IIA) has the same meaning as described above for the formula (II), and the preferred examples are also the same as described above for the formula (II).

Preferred examples of the compound having the formula (I), which includes the formulas (II) and (IIA), are shown below.

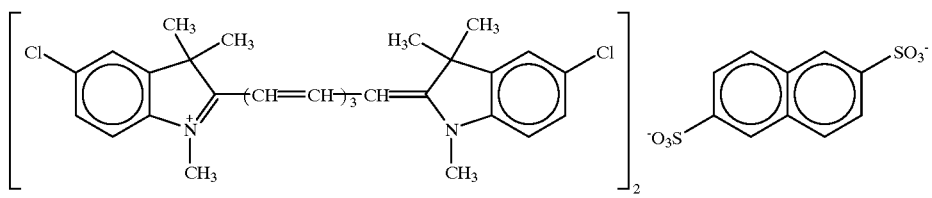

I-1

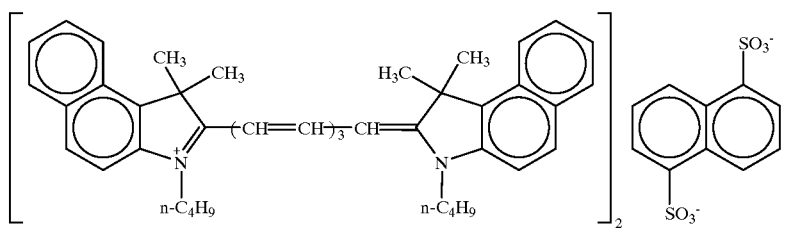

I-2

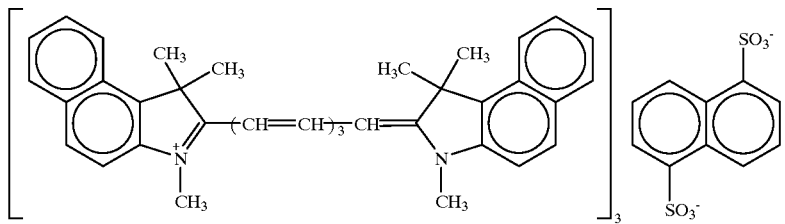

I-3

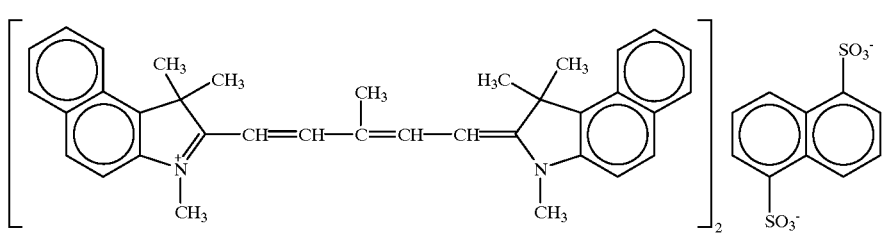

I-4

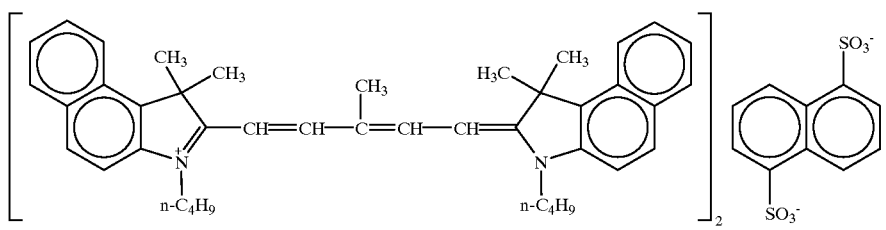
I-5
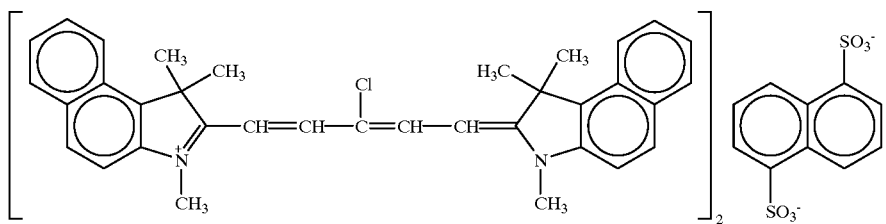
I-6
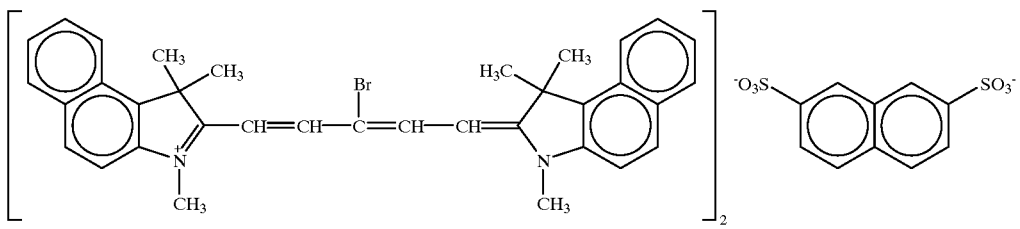
I-7
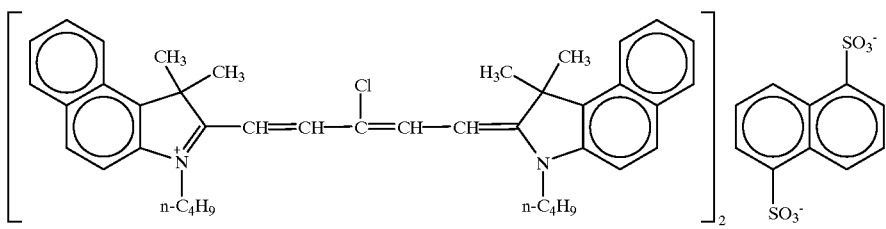
I-8
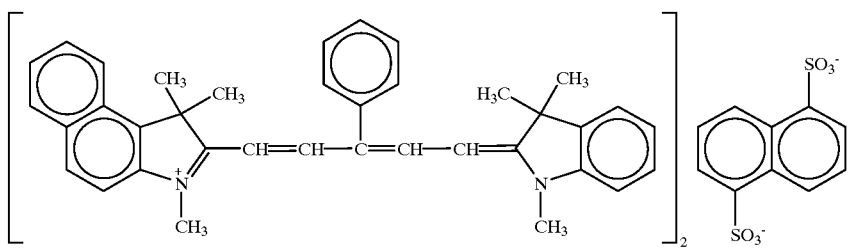
I-9
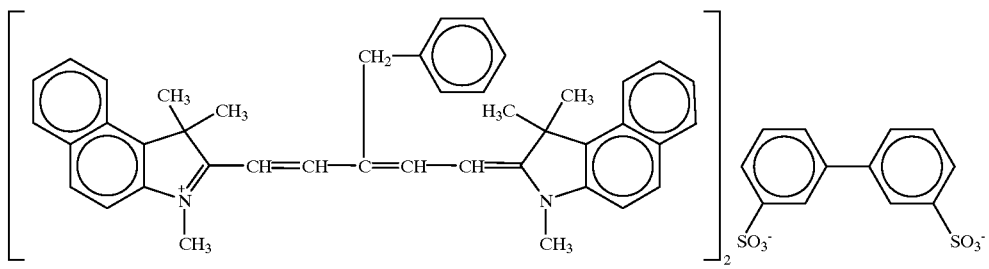
I-10

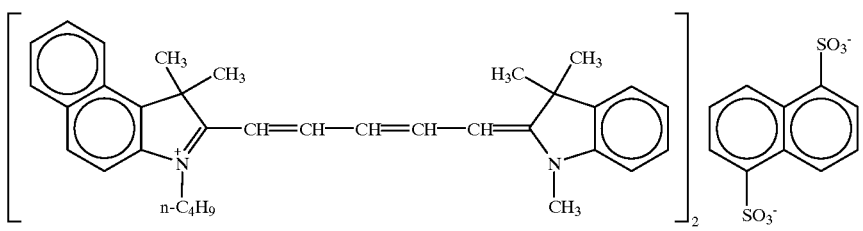
I-11
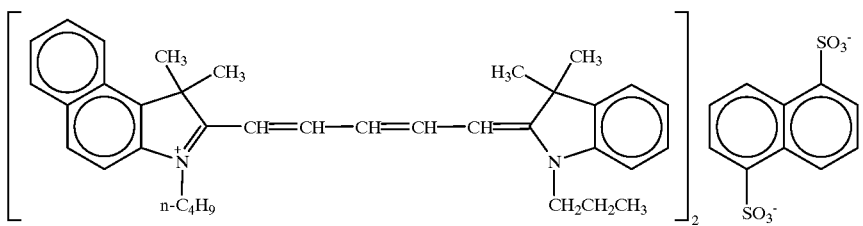
I-12
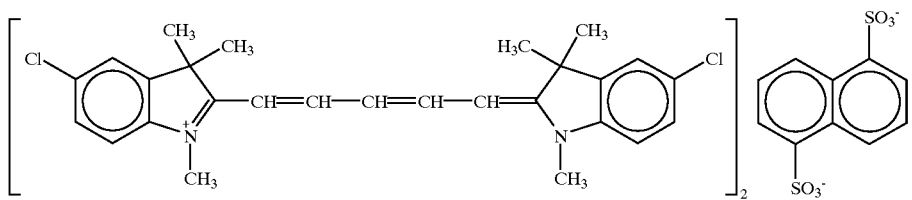
I-13
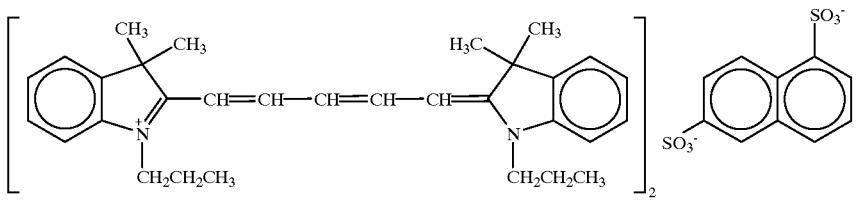
I-14
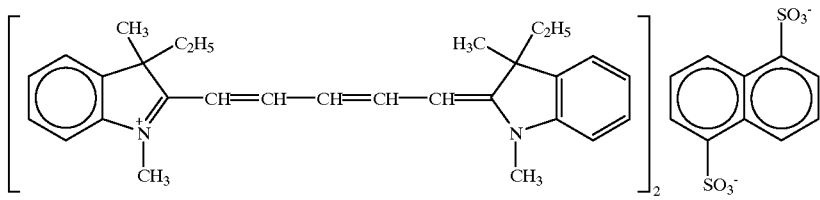
I-15
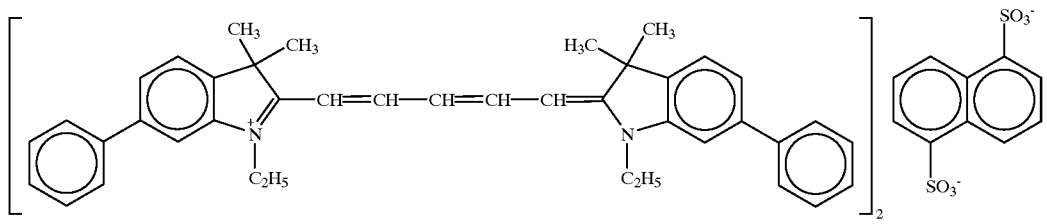
I-16
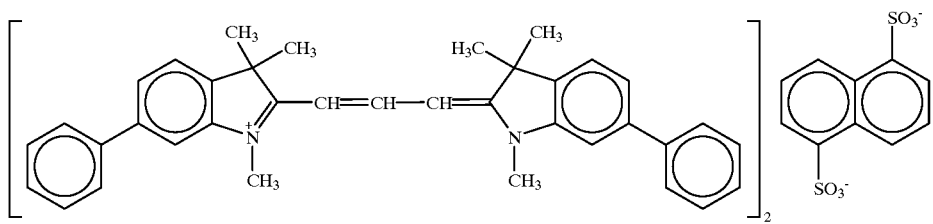
I-17

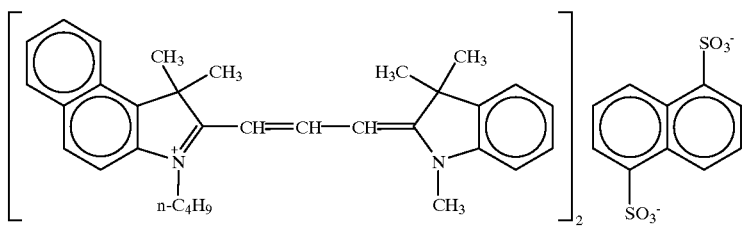
I-18
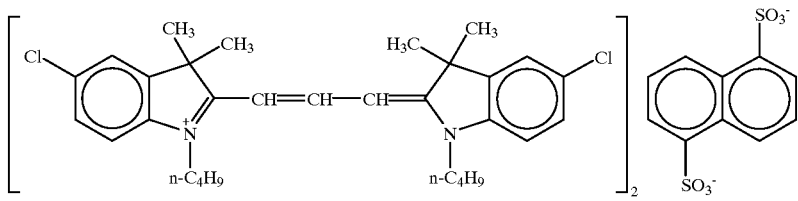
I-19
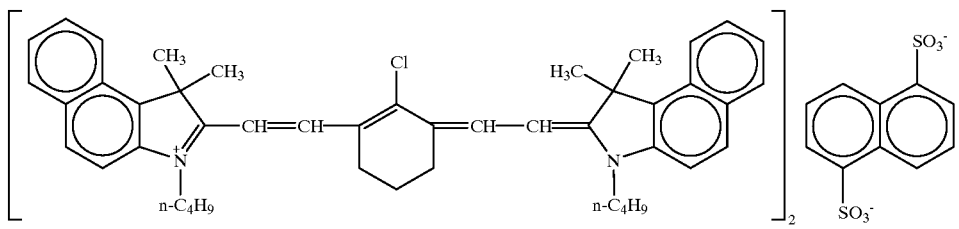
I-20
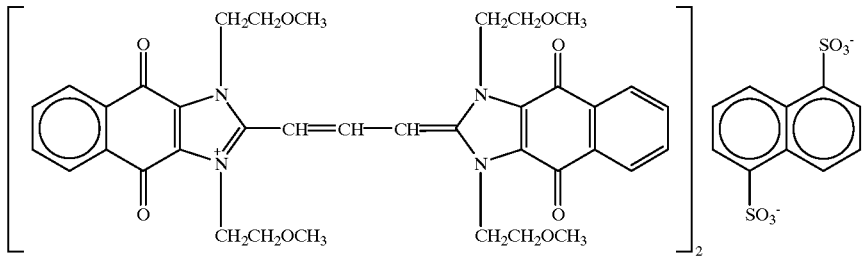
I-21
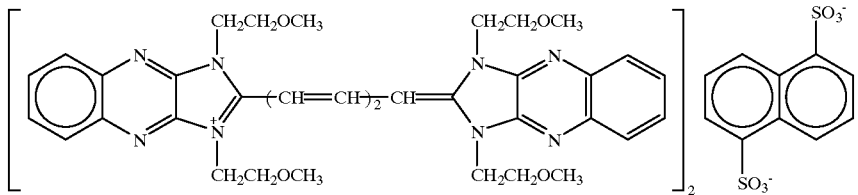
I-22
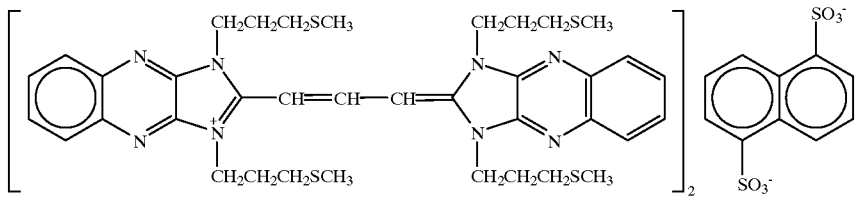
I-23
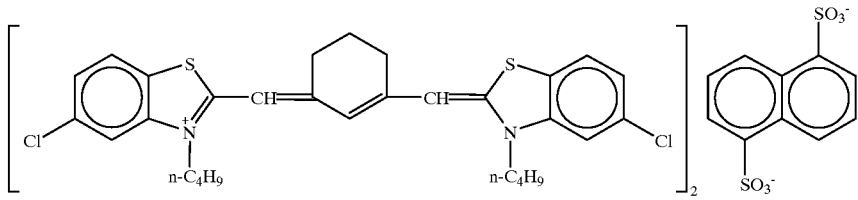
I-24

-continued
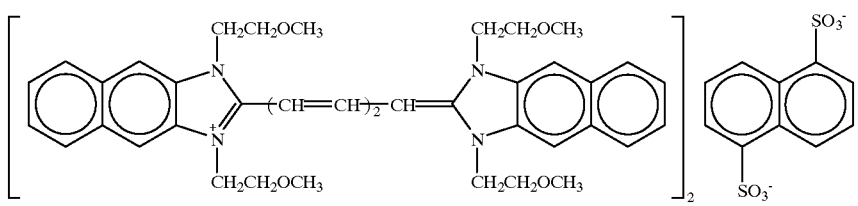 I-25
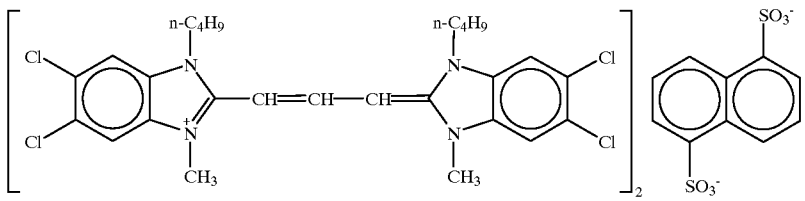 I-26
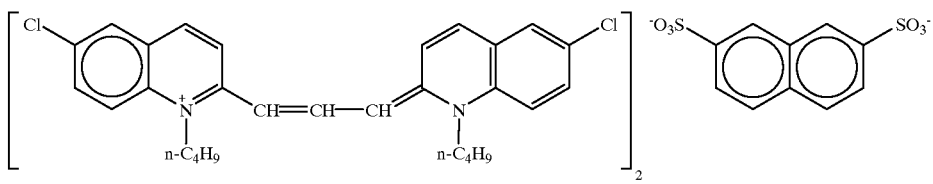 I-27
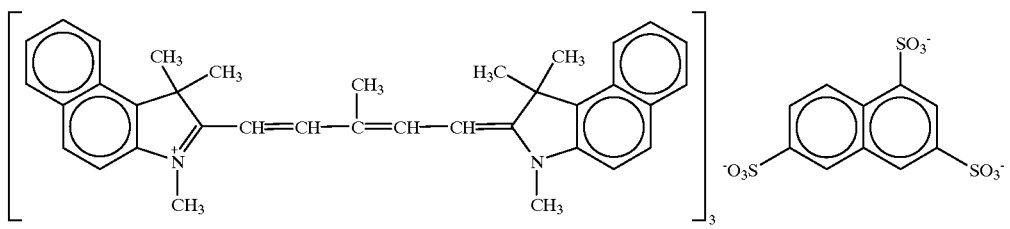 I-28
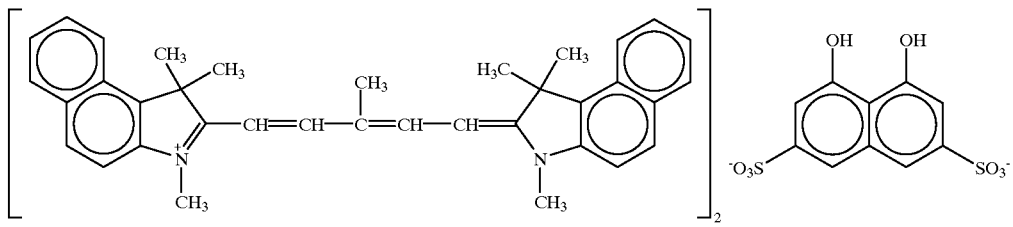 I-29
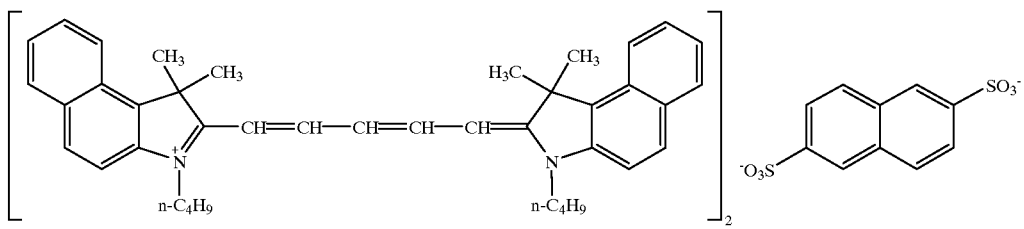 I-30
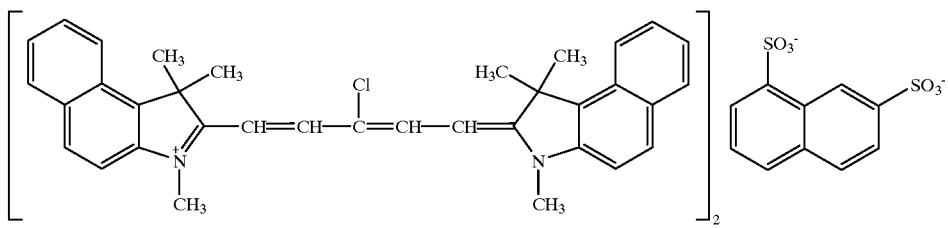 I-31

-continued

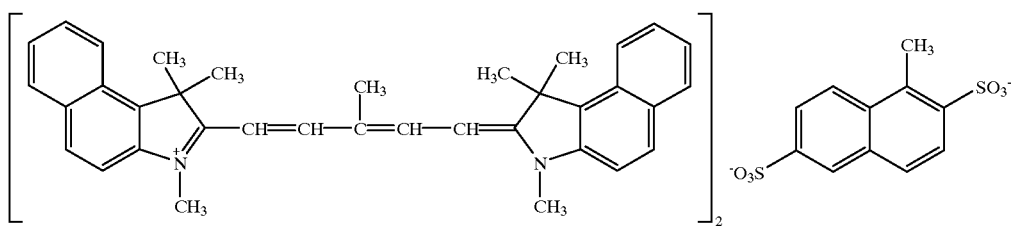

I-32

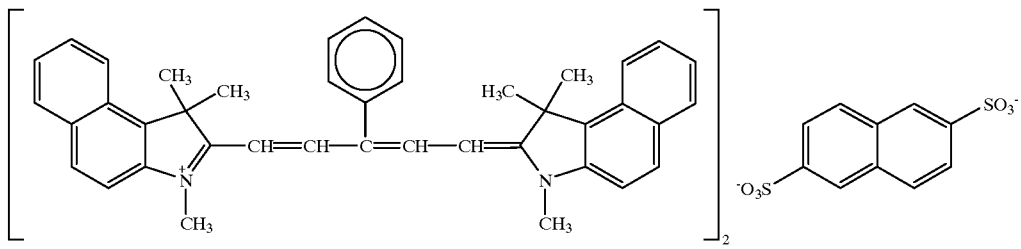

I-33

The compound of the formula (I) of the invention can be employed singly or in combination with two or more compounds.

The compound of the formula (I) can be easily prepared in the manner described in the following texts: "The Cyanine dyes and Related Compounds", pp. 55-, written by F. M. Hamer (Interscience Publishers, New York, London, published in 1964); "Polymethine Dyes", pp. 23 and 38, written by Nikolai Tyutyulkov, Jurgen Fabian, Achim Ulehlihorn, Fritz Dietz and Alia Tadjer (St. Kliment Ohridski University Press, Sophia); "Heterocyclic Compounds—Special Topics in Heterocyclic Chemistry", Chapter 18, Section 14, pp. 482–515, written by D. M. Sturmer (John Wiley & Sons, New York, London, published in 1977); and "Rodd's Chemistry of Carbon Compounds, 2nd edition, part B", Chapter 15, pp. 369–422 (1977), Chapter 15, pp. 267–296 (1985) (Elsevir Science Publishing Company Inc., New York).

The polyvalent anion can be introduced into the dye as a counter ion, for example, in the following manner.

A cyanine dye having a monovalent counter ion is dissolved in an appropriate solvent. To the solution, a solution of a polyvalent acid or its salt is added and then optionally another solvent in which the dye is insoluble is added to precipitate the dye having a polyvalent counter anion. This method is very easy and suitable for synthesis on a large scale. The polyvalent anion can be also introduced utilizing an ion exchange resin.

The cyanine dye of the invention can be prepared in the manner described in the following synthesis example.

[Synthesis Example]

(Preparation of the compound I-4)

A compound consisting of the cation part of the compound I-4 and p-toluenesulfonate anion was prepared in the known manner. 23.6 g (0.04 mol) of the prepared compound was dissolved in 400 ml of methanol, and then 7.2 g (0.02 mol) of naphthalene-1,5-disulfonic acid was added. The resulting solution was stirred at 50° C. for 1 hour. After cooling, deposited precipitation was collected and washed with methanol, followed by drying over-night at 50° C. (yield: 22.3 g, melting point: 238° C.).

With respect to the compound represented by the formula (A1) or (A2), a detailed description is given below.

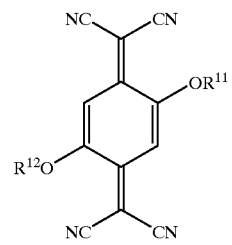

A1

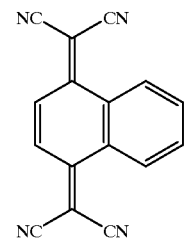

A2

In the formula (A1), each of $R^{11}$ and $R^{12}$ independently represents a hydrocarbon group. Preferably, the hydrocarbon group is a non-substituted alkyl group having 1–18 (more preferably 1–10, further preferably 1–6) carbon atoms which may be of a straight, branched or cyclic chain. A non-substituted alkyl group having 1–10 (more preferably 1–6) carbon atoms which may be of a straight or branched chain is particularly preferred. Examples of the alkyl groups include methyl, ethyl, propyl, iso-propyl, butyl, iso-butyl, tert-butyl, pentyl, hexyl, octyl, and decyl. Concrete examples of the compound represented by the formula (A1) are shown below.

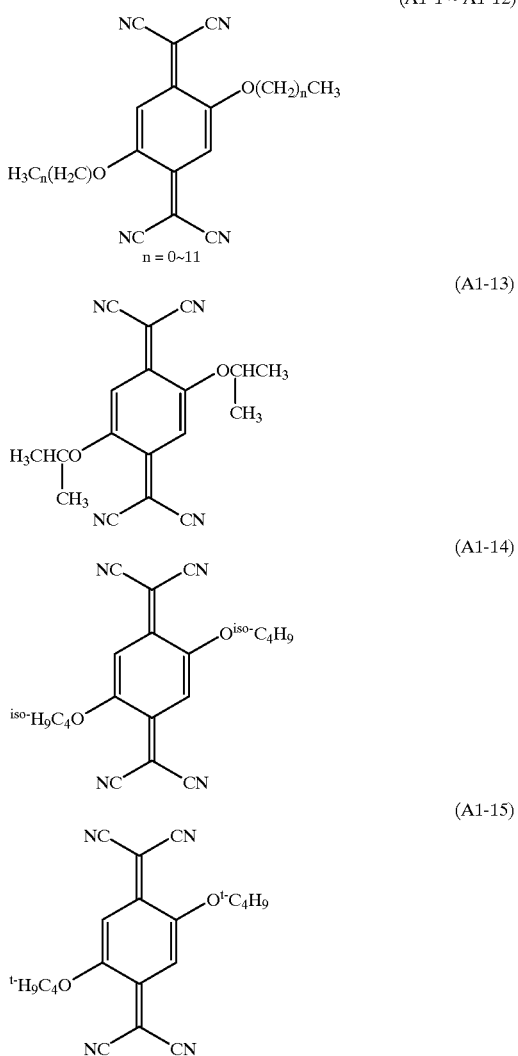

The compound of the formula (A1) or (A2) can be employed singly or in combination with two or more compounds.

The optical information recording medium of the invention comprises a substrate, a recording layer provided on the substrate, and a light-reflecting layer provided on the recording layer, wherein the recording layer contains the cyanine dye of the formula (I) and the compound (anti-fading agent) of the formula (A1) or (A2).

The optical information recording medium of the invention can be prepared, for example, by the following process.

The substrate (support) which is transparent can be made of any of materials known as the materials for the producing the substrate of the optical information recording medium. Examples of the materials include glass, polycarbonate, acrylic resins such as polymethyl methacrylate, vinyl chloride resins such as polyvinyl chloride and vinyl chloride copolymer, epoxy resins, amorphous polyolefins, and polyesters. These materials can be employed in combination, if desired. These materials are molded to give a film or a rigid plate. Polycarbonate is most preferred from the viewpoints of anti-humidity and dimensional stability.

The substrate may have an undercoating layer on its surface on the recording layer side, so as to enhance surface smoothness and adhesion and to keep the dye recording layer from deterioration. Examples of the material for the undercoating layer include polymers such as polymethyl methacrylate, acrylate/methacrylate copolymer, styrene/maleic anhydride copolymer, polyvinyl alcohol, N-methylolacrylamide, styrene/vinyltoluene copolymer, chloro-sulfonated polyethylene, nitrocellulose, polyvinyl chloride, chlorinated polyolefin, polyester, polyimide, vinyl acetate-vinyl chloride copolymer, ethylene-vinyl acetate copolymer, polyethylene, polypropylene, and polycarbonate, and surface treating agents such as a silane-coupling agent.

The undercoating layer can be formed by applying a coating solution (in which one or more of the above-mentioned materials are dissolved or dispersed) onto the surface of the substrate by the known coating methods such as spin-coat, dip-coat, and extrusion-coat. The undercoating layer generally has a thickness of 0.005 to 20 $\mu$m, preferably 0.01 to 10 $\mu$m.

On the surface of the substrate or on the undercoating layer, a groove for tracking or giving address signals is preferably formed. The groove is preferably formed directly on the surface of the substrate when the substrate is molded from polymer material by injection or extrusion.

Alternatively, the groove can be provided on the surface of the substrate by placing a pregroove layer. The pregroove layer can be produced from a mixture of a monomer such as monoester, diester, triester, or tetraester of acrylic acid, or its oligomer, and a light-polymerization reaction initiator. The pregroove layer can be produced by the steps of coating a mixture of the polymerization initiator and the monomer such as the above-mentioned acrylic ester on a precisely produced stamper, placing on the coated layer a substrate, and irradiating the coated layer with ultra-violet rays through the stamper or substrate, so as to cure the coated layer as well as to combine the cured layer and the substrate. The substrate to which the cured coated layer is attached is separated from the stamper, to give the desired substrate equipped with the pregroove layer. The thickness of the pregroove layer generally is in the range of 0.05 to 100 $\mu$m, preferably in the range of 0.1 to 50 $\mu$m.

The pregroove formed on the substrate preferably has a depth in the range of 300 to 2,000 angstroms and a half-width of 0.2 to 0.9 $\mu$m. The depth of 1,500 to 2,000 angstroms of the pregroove is preferably adopted because such pregroove can enhance the sensitivity without decreasing the light-reflection on the substrate. The optical disc having a recording layer coated on the deep pregoove and a light-reflection layer shows a high sensitivity, and hence is employable even in a recording system using a laser light of low laser power. This means that a semiconductor laser of a low output power can be employed, and the life of semiconductor laser can be prolonged.

On the substrate, the recording dye layer is placed.

The recording layer can be formed on the substrate (support) by coating a solution of a mixture of the above anti-fading agent, the cyanine dye, and if desired, binder in an organic solvent and drying the coated layer. The compound of the formula (A1) or (A2) is employed in the amount of 0.1 to 50 wt. %, preferably 0.5 to 45 wt. %, more preferably 3 to 40 wt. %, further preferably 5 to 25 wt. %, based on the amount of the cyanine dye.

Examples of solvents for the coating solution include esters such as butyl acetate and cellosolve acetate; ketones such as methyl ethyl ketone, cyclohexanone and methyl isobutyl ketone; chlorinated hydrocarbons such as dichloromethane, 1,2-dichloroethane and chloroform;

amides such as dimethylformamide; hydrocarbons such as cyclohexanone; ethers such as tetrahydrofuran, diethyl ether and dioxane; alcohols such as ethanol, n-propanol, isopropanol, n-butanol, and diacetone alcohol; fluorine-containing solvents such as 2,2,3,3-tetrafluoropropanol; and glycol ethers such as ethyleneglycol monomethyl ether, ethyleneglycol monoethyl ether, and propylene-glycol monomethyl ether. These solvents can be employed in combination, in consideration of the solubility of the used compound in the solvent.

The coating solution can further contain auxiliary additives such as an oxidation inhibitor, a UV absorber, a plasticizer, and a lubricant.

Examples of the binders include natural-origin polymers such as gelatin, cellulose derivatives, dextran, rosin, and rubber; hydrocarbon polymer resins such as polyethylene, polypropylene, polystyrene and polyisobutyrene; vinyl polymers such as polyvinyl chloride, polyvinylidene chloride, and vinyl chloride-vinyl acetate copolymer; acrylate polymers such as polymethyl acrylate and polymethyl methacrylate; polyvinyl alcohol, chlorinated polyethylene; epoxy resins; butyral resins, rubber derivatives, and thermosetting resins such as prepolymers of phenol-formaldehyde. The binder is optionally employable in an amount of 0.01 to 50 weight parts, preferably 0.1 to 5 weight parts, more preferably 0.1 to 0.5 weight part, per 1 weight part of the dye.

The coating solution generally has a concentration of 0.01 to 10 wt. % (solid content), preferably 0.1 to 5 wt. %.

The coating can be performed by the known methods such as spray coat, spin coat, dip coat, roller coat, blade coat, doctor roller coat and screen print.

The recording layer can be a single layer or can comprise plural layers. The thickness of the recording layer generally is in the range of 20 to 500 nm, preferably 50 to 300 nm. The recording layer can be provided on both surfaces of the substrate.

On the recording layer, the light-reflecting layer is placed so as to enhance the light-reflection in the course of reproduction of information.

The light-reflecting material to be used for the formation of the light-reflecting layer should show a high reflection to the laser light. Examples of the light-reflecting materials include metals and sub-metals such as Mg, Se, Y, Ti, Zr, Hf, V, Nb, Ta, Cr, Mo, W, Mn, Re, Fe, Co, Ni, Ru, Rh, Pd, Ir, Pt, Cu, Ag, Au, Zn, Cd, Al, Ga, In, Si, Ge, Te, Pb, Po, Sn, and Bi. Stainless steel film-is also employable. Preferred light-reflecting materials are Cr, Ni, Pt, Cu, Ag, Au, Al and stainless steel film. These materials can be employed singly, in combination, or in the form of alloy. Particularly preferred is Au.

The light-reflecting layer can be formed on the recording layer by vacuum deposition, sputtering or ion-plating. The thickness of the light-reflecting layer generally is in the range of 10 to 800 nm, preferably 20 to 500 nm, further preferably 50 to 300 nm. The ratio between the thickness of the recording layer (Ra) and that of the light-reflecting layer (Rb) generally satisfies the condition of $0.01 \leq Ra/Rb \leq 50$, preferably $0.05 \leq Ra/Rb \leq 40$, more preferably $0.08 Ra/Rb \leq 25$, and further preferably $0.08 \leq Ra/Rb \leq 15$.

On the light-reflecting layer, a protective layer can be placed so as to protect the recording layer from chemical deterioration or physical shock. The protective layer can be also placed on the substrate on the face not having the recording layer so as to enhance the scratch resistance and the moisture resistance of the medium.

The protective layer can be formed of inorganic materials such as $Sio$, $SiO_2$, $MgF_2$, $SnO_2$, $Si_3N_4$; or organic materials such as thermo-plastic resins, thermo-setting resins, and UV curable resins.

The protective layer can be formed on the light-reflecting layer and/or the substrate by laminating a film of plastic material using an adhesive. The inorganic material can be also placed on the light-reflecting layer and/or the substrate by vacuum deposition or sputtering. Otherwise, the organic polymer material can be coated in the form of a solution containing the polymer material and dried to give the protective layer. The UV curable resin is dissolved in a solvent and coated on the light-reflecting layer and/or the substrate, and cured by applying ultra-violet rays to the coated layer. The coating layer can contain various additives such as an anti-static agent, an oxidation inhibitor, and a ultra-violet absorber. The protective layer generally has a thickness of 0.1 to 100 μm.

The information recording medium of the invention can comprise one substrate having one or two recording layers or two substrates each of which has one recording layer and combined to give a known air sandwich structure.

The information recording medium of the invention shows high light-resistance as well as high light-reflection, and hence the reproduction of the recorded information can be accomplished by means of a commercially available CD player.

The information recording can be carried out in the following manner using the recording medium of the invention.

The information recording medium is rotated at a predetermined constant line rate (1.2 to 14 m/sec., in the case of CD format) or a predetermined constant angle rate. On the rotated medium, a recording light source such as a semiconductor laser beam is applied through the transparent substrate. By the application of the laser beam, pits are formed in the recording layer. The pit is assumed to be produced by local vacancy of the recording layer, deformation of the recording layer and/or the substrate, change of the physical or chemical characteristics of the recording layer. The light source preferably is a semiconductor laser having an oscillation frequency in the range of 500 to 850 nm. The preferred beam wavelength is in the range of 500 to 800 nm. In the case of the CR-R type recording medium, the laser beam preferably has a wavelength of 770 to 790 nm.

The reproduction of the recorded information can be accomplished by applying a semiconductor laser beam on the medium rotated at the same rate as that employed in the recording procedure. The light-reflection is then detected from the substrate side.

The present invention is further described by the following non-restrictive working examples.

EXAMPLES AND COMPARISON EXAMPLES

The cyanine dyes of the invention (I-4, I-30, I-31, 25 and I-32) and the dye for comparison having the following formula (B) were prepared.

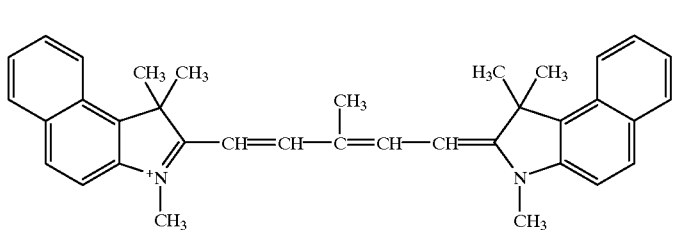
(B)

Independently, the anti-fading agents of the invention (A1-1, A1-8, A1-14 and A2) and the anti-fading agents for comparison having the following formulas (a-1) and (a-2) were prepared.

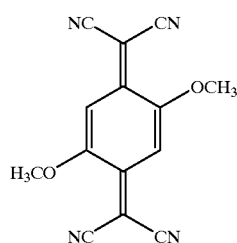
(A1-1)

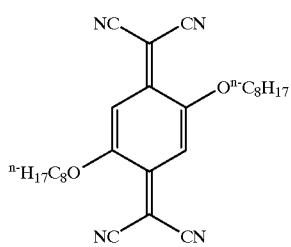
(A1-8)

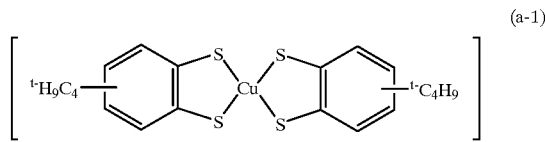
(a-1)

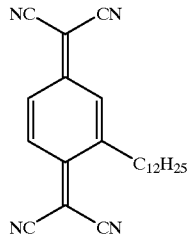
(a-2)

In the combination shown in the below-mentioned table, the cyanine dye and the anti-fading agent were mixed. The resulting mixture was dissolved in 2,2,3,3-tetrafluoropropanol to give a coating solution.

The coating solution was coated by spin coat on the surface of a polycarbonate substrate (diameter: 120 mm, thickness: 1.2 mm, Panlight AD (trade name), available from Teijin Limited) to give a coated layer of approx. 200 nm thick. The substrate had a spirally formed pregroove (track pitch: 1.6 $\mu$m, groove width: 0.4 $\mu$m, depth: 0.16 $\mu$m) which was produced in the injection molding of the substrate.

On the coated dye layer, a light-reflecting layer made of gold was provided by sputtering, so that the thickness ratio of recording layer/light-reflecting layer might be set the value shown in the below-mentioned table. After that, a UV curable photopolymer (UV curable agent: SD-220, available from Dainippon Ink & Chemicals, Inc.) was coated on the light-reflecting layer to give a coated layer of 8 $\mu$m thick. The coated layer was irradiated with ultra-violet rays to be cured to form a protective layer. Thus, an information recording medium of each example was prepared.

[Evaluation of Optical Information Recording Medium]

On the recording medium rotating at 1.4 m/sec., EFM signals of 3T were recorded by means of a laser beam of wavelength 780 nm. After that, the recording medium was exposed to light of 140,000 lux from Xe larrp (at 80° C., 85% RH) for 12 hours, for 18 hours, for 24 hours, for 36 hours or for 48 hours. Before and after above exposure, the recording and reproducing characteristics of the sample medium were evaluated by OTM-2000 (available from Passtec) at the optimized power. The results are set forth in the following table.

| | Recording and Reproducing Characteristics | | |
|---|---|---|---|
| | Block Error | 3T Jitter | Cross Talk |
| Ex. 1 | Cyanine dye: I-4 | | |
| | Anti-fading agent: A1-1 (0.8 wt. % per dye) | | |
| | Thickness ratio (Ra/Rb): 1.8 | | |
| (none) | 0 | 18 | 33 |
| (12 hrs) | 0 | 18 | 33 |
| (18 hrs) | 23 | 30 | 54 |
| (24 hrs) | 102 | 28 | 54 |
| (36 hrs) | — | — | — |
| (48 hrs) | — | — | — |
| Ex. 2 | Cyanine dye: I-4 | | |
| | Anti-fading agent: A1-1 (1 wt. % per dye) | | |
| | Thickness ratio (Ra/Rb): 1.8 | | |
| (none) | 0 | 19 | 33 |
| (12 hrs) | 0 | 19 | 33 |
| (18 hrs) | 0 | 19 | 33 |
| (24 hrs) | 0 | 19 | 33 |
| (36 hrs) | 113 | 33 | 65 |
| (48 hrs) | — | — | — |
| Ex. 3 | Cyanine dye: I-4 | | |
| | Anti-fading agent: A1-1 (3 wt. % per dye) | | |
| | Thickness ratio (Ra/Rb): 1.8 | | |
| (none) | 0 | 18 | 32 |
| (12 hrs) | 0 | 18 | 32 |
| (18 hrs) | 0 | 18 | 32 |
| (24 hrs) | 0 | 18 | 32 |
| (36 hrs) | 54 | 24 | 42 |
| (48 hrs) | 123 | 18 | 68 |

Recording and Reproducing Characteristics

| Ex. 4 | Cyanine dye: I-4<br>Anti-fading agent: A1-1 (5 wt. % per dye)<br>Thickness ratio (Ra/Rb): 1.8 | | |
|---|---|---|---|
| (none) | 0 | 17 | 33 |
| (12 hrs) | 0 | 17 | 33 |
| (18 hrs) | 0 | 17 | 33 |
| (24 hrs) | 0 | 17 | 33 |
| (36 hrs) | 15 | 18 | 39 |
| (48 hrs) | 10 | 23 | 38 |

| Ex. 5 | Cyanine dye: I-4<br>Anti-fading agent: A1-1 (10 wt. % per dye)<br>Thickness ratio (Ra/Rb): 1.8 | | |
|---|---|---|---|
| (none) | 0 | 17 | 32 |
| (12 hrs) | 0 | 17 | 32 |
| (18 hrs) | 0 | 17 | 32 |
| (24 hrs) | 0 | 17 | 32 |
| (36 hrs) | 0 | 18 | 34 |
| (48 hrs) | 10 | 17 | 38 |

| Ex. 6 | Cyanine dye: I-4<br>Anti-fading agent: A1-1 (15 wt. % per dye)<br>Thickness ratio (Ra/Rb): 1.8 | | |
|---|---|---|---|
| (none) | 0 | 18 | 33 |
| (12 hrs) | 0 | 18 | 33 |
| (18 hrs) | 0 | 18 | 33 |
| (24 hrs) | 0 | 18 | 33 |
| (36 hrs) | 0 | 18 | 33 |
| (48 hrs) | 5 | 18 | 35 |

| Ex. 7 | Cyanine dye: I-4<br>Anti-fading agent: A1-1 (25 wt. % per dye)<br>Thickness ratio (Ra/Rb): 1.8 | | |
|---|---|---|---|
| (none) | 0 | 19 | 31 |
| (12 hrs) | 0 | 19 | 31 |
| (18 hrs) | 0 | 19 | 31 |
| (24 hrs) | 0 | 19 | 31 |
| (36 hrs) | 0 | 19 | 33 |
| (48 hrs) | 3 | 19 | 37 |

| Ex. 8 | Cyanine dye: I-4<br>Anti-fading agent: A1-1 (30 wt. % per dye)<br>Thickness ratio (Ra/Rb): 1.8 | | |
|---|---|---|---|
| (none) | 0 | 20 | 32 |
| (12 hrs) | 0 | 20 | 32 |
| (18 hrs) | 0 | 20 | 32 |
| (24 hrs) | 0 | 20 | 32 |
| (36 hrs) | 15 | 23 | 37 |
| (48 hrs) | 24 | 20 | 45 |

| Ex. 9 | Cyanine dye: I-4<br>Anti-fading agent: A1-1 (40 wt. % per dye)<br>Thickness ratio (Ra/Rb): 1.8 | | |
|---|---|---|---|
| (none) | 0 | 21 | 33 |
| (12 hrs) | 0 | 21 | 33 |
| (18 hrs) | 0 | 21 | 33 |
| (24 hrs) | 0 | 21 | 33 |
| (36 hrs) | 20 | 26 | 38 |
| (48 hrs) | 28 | 21 | 48 |

| Ex. 10 | Cyanine dye: I-4<br>Anti-fading agent: A1-1 (50 wt. % per dye)<br>Thickness ratio (Ra/Rb): 1.8 | | |
|---|---|---|---|
| (none) | 8 | 26 | 38 |
| (12 hrs) | 8 | 26 | 38 |
| (18 hrs) | 10 | 26 | 38 |
| (24 hrs) | 25 | 27 | 39 |
| (36 hrs) | 28 | 30 | 42 |
| (48 hrs) | — | — | — |

| Ex. 11 | Cyanine dye: I-4<br>Anti-fading agent: A1-1 (60 wt % per dye)<br>Thickness ratio (Ra/Rb): 1.8 | | |
|---|---|---|---|
| (none) | 14 | 28 | 48 |
| (12 hrs) | 14 | 28 | 48 |
| (18 hrs) | 34 | 28 | 48 |
| (24 hrs) | 98 | 29 | 49 |
| (36 hrs) | — | — | — |
| (48 hrs) | — | — | — |

| Ex. 12 | Cyanine dye: I-4<br>Anti-fading agent: A1-1 (15 wt. % per dye)<br>Thickness ratio (Ra/Rb): 0.04 | | |
|---|---|---|---|
| (none) | 0 | 22 | 37 |
| (12 hrs) | 0 | 22 | 37 |
| (18 hrs) | 36 | 28 | 40 |
| (24 hrs) | 112 | 39 | 59 |
| (36 hrs) | — | — | — |
| (48 hrs) | — | — | — |

| Ex. 13 | Cyanine dye: I-4<br>Anti-fading agent: A1-1 (15 wt. % per dye)<br>Thickness ratio (Ra/Rb): 0.05 | | |
|---|---|---|---|
| (none) | 0 | 20 | 35 |
| (12 hrs) | 0 | 20 | 35 |
| (18 hrs) | 6 | 24 | 37 |
| (24 hrs) | 34 | 28 | 42 |
| (36 hrs) | 103 | 37 | 56 |
| (48 hrs) | — | — | — |

| Ex. 14 | Cyanine dye: I-4<br>Anti-fading agent: A1-1 (15 wt. % per dye)<br>Thickness ratio (Ra/Rb): 0.1 | | |
|---|---|---|---|
| (none) | 0 | 18 | 32 |
| (12 hrs) | 0 | 18 | 32 |
| (18 hrs) | 0 | 18 | 32 |
| (24 hrs) | 0 | 18 | 32 |
| (36 hrs) | 0 | 20 | 33 |
| (48 hrs) | 4 | 20 | 33 |

| Ex. 15 | Cyanine dye: I-4<br>Anti-fading agent: Al-1 (15 wt. % per dye)<br>Thickness ratio (Ra/Rb): 10 | | |
|---|---|---|---|
| (none) | 0 | 19 | 32 |
| (12 hrs) | 0 | 19 | 32 |
| (18 hrs) | 0 | 20 | 32 |
| (24 hrs) | 0 | 20 | 32 |
| (36 hrs) | 0 | 21 | 32 |
| (48 hrs) | 8 | 22 | 34 |

| Ex. 16 | Cyanine dye: I-4<br>Anti-fading agent: Al-1 (15 wt. % per dye)<br>Thickness ratio (Ra/Rb): 20 | | |
|---|---|---|---|
| (none) | 0 | 20 | 35 |
| (12 hrs) | 0 | 20 | 35 |
| (18 hrs) | 0 | 23 | 35 |
| (24 hrs) | 0 | 23 | 35 |
| (36 hrs) | 32 | 38 | 39 |
| (48 hrs) | 86 | 29 | 48 |

| Ex. 17 | Cyanine dye: I-4<br>Anti-fading agent: A1-1 (15 wt. % per dye)<br>Thickness ratio (Ra/Rb): 30 | | |
|---|---|---|---|
| (none) | 0 | 20 | 38 |
| (12 hrs) | 0 | 20 | 38 |
| (18 hrs) | 6 | 24 | 38 |
| (24 hrs) | 23 | 28 | 39 |
| (36 hrs) | 52 | 34 | 48 |
| (48 hrs) | 121 | 39 | 63 |

| Ex. 18 | Cyanine dye: I-4<br>Anti-fading agent: A1-1 (15 wt. % per dye)<br>Thickness ratio (Ra/Rb): 40 | | |
|---|---|---|---|
| (none) | 0 | 21 | 43 |
| (12 hrs) | 0 | 21 | 43 |
| (18 hrs) | 9 | 26 | 38 |
| (24 hrs) | 43 | 30 | 49 |
| (36 hrs) | 113 | 41 | 59 |
| (48 hrs) | — | — | — |

| Ex. 19 | Cyanine dye: I 4:<br>Anti-fading agent: A1-1 (15 wt. % per dye)<br>Thickness ratio (Ra/Rb): 50 | | |
|---|---|---|---|
| (none) | 0 | 23 | 48 |
| (12 hrs) | 0 | 23 | 48 |

-continued

| Recording and Reproducing Characteristics | | | |
|---|---|---|---|
| (18 hrs) | 21 | 29 | 50 |
| (24 hrs) | 111 | 36 | 56 |
| (36 hrs) | — | — | — |
| (48 hrs) | — | — | — |
| Ex. 20 | Cyanine dye: I-30 | | |
| | Anti-fading agent: A1-14 (15 wt. % per dye) | | |
| | Thickness ratio (Ra/Rb): 1.8 | | |
| (none) | 0 | 19 | 32 |
| (12 hrs) | 0 | 19 | 32 |
| (18 hrs) | 0 | 19 | 33 |
| (24 hrs) | 0 | 19 | 33 |
| (36 hrs) | 0 | 20 | 33 |
| (48 hrs) | 5 | 22 | 34 |
| Ex. 21 | Cyanine dye: I-31 | | |
| | Anti-fading agent: A1-8 (15 wt. % per dye) | | |
| | Thickness ratio (Ra/Rb) : 1.8 | | |
| (none) | 0 | 20 | 33 |
| (12 hrs) | 0 | 20 | 33 |
| (18 hrs) | 0 | 20 | 33 |
| (24 hrs) | 0 | 20 | 33 |
| (36 hrs) | 0 | 20 | 34 |
| (48 hrs) | 2 | 21 | 35 |
| Ex. 22 | Cyanine dye: I-32 | | |
| | Anti-fading agent: A2 (15 wt. % per dye) | | |
| | Thickness ratio (Ra/Rb): 1.8 | | |
| (none) | 0 | 18 | 34 |
| (12 hrs) | 0 | 18 | 34 |
| (18 hrs) | 0 | 19 | 36 |
| (24 hrs) | 0 | 19 | 36 |
| (36 hrs) | 0 | 21 | 37 |
| (48 hrs) | 6 | 22 | 37 |
| C. Ex. 1 | Cyanine dye: I-4 | | |
| | Anti-fading agent: a-1 (10 wt. % per dye) | | |
| | Thickness ratio (Ra/Rb): 1.8 | | |
| (none) | 0 | 27 | 32 |
| (12 hrs) | 111 | 42 | 58 |
| (18 hrs) | — | — | — |
| (24 hrs) | — | — | — |
| (36 hrs) | — | — | — |
| (48 hrs) | — | — | — |
| C. Ex. 2 | Cyanine dye: B | | |
| | Anti-fading agent: A1-1 (15 wt. % per dye) | | |
| | Thickness ratio (Ra/Rb): 1.8 | | |
| (none) | 0 | 26 | 32 |
| (12 hrs) | 53 | 35 | 36 |
| (18 hrs) | 185 | 42 | 66 |
| (24 hrs) | — | — | — |
| (36 hrs) | — | — | — |
| (48 hrs) | — | — | — |
| C. Ex. 3 | Cyanine dye: I-4 | | |
| | Anti-fading agent: a-2 (10 wt. % per dye) | | |
| | Thickness ratio (Ra/Rb): 1.8 | | |
| (none) | 0 | 22 | 33 |
| (12 hrs) | 20 | 25 | 42 |
| (18 hrs) | 90 | 38 | 51 |
| (24 hrs) | — | — | — |
| (36 hrs) | — | — | — |
| (48 hrs) | — | — | — |

Remarks: (Ra/Rb) means the ratio between the thickness of the recording layer (Ra) and that of the light-reflecting layer (Rb); (none) means the data before exposure to Xe lamp, and (12 hrs), (18 hrs), (24 hrs), (36 hrs) and (48 hrs) mean the data after 12 hours, 18 hours, 24 hours, 36 hours and 48 hours exposure, respectively; and "—" means that the tracking was failed.

Each of the samples of Examples 1–22 has a recording layer containing the anti-fading agent of the invention and the cyanine dye consisting of two monovalent cyanine dye cations and a divalent anion. Each of the media of Comparison Examples 1 and 3 has a recording layer containing a conventional anti-fading agent (a-1, a-2) and the cyanine dye (I-4) of the invention, and the medium of Comparison Example 2 has a recording layer containing the anti-fading agent (A1-1) of the invention and a conventional cyanine dye (B) consisting of one monovalent cyanine dye cation and a monovalent anion.

As is evident from the results set forth in Table 1, the samples of Examples 1–22 of the invention exhibit high light-resistance, as compared with the conventional media of Comparison Examples.

What is claimed is:

1. An optical information recording medium comprising a substrate, a recording layer on which information is recordable by irradiation with a laser beam, and a light-reflecting layer overlaid in order, wherein said recording layer comprises:

a cyanine dye compound having the following formula (II):

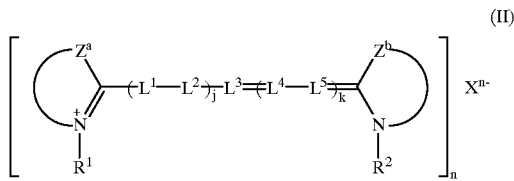

in which each of $Z^a$ and $Z^b$ independently represents an atomic group required for forming a 5- or 6-membered nitrogen-containing heterocyclic ring; each of $R^1$ and $R^2$ independently represents an alkyl group or an aryl group: each of $L^1$, $L^2$, $L^3$, $L^4$ and $L^5$ independently represents a methine group which may have a substituent group, and in the case that $L^1$ to $L^5$ have a substituent group, it may be combined with another to form a ring: i represents an integer of 0. 1 or 2: k represents an integer of 0 or 1; $X^{n-}$ represents an n-valent anion: and n represents an integer of 2 or more; and a compound having the following formula (A1) or (A2):

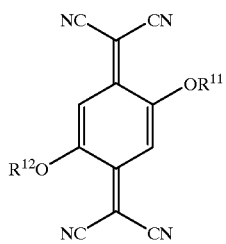

A1

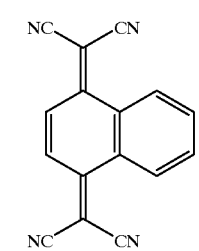

A2 in which each of $R^{11}$ and $R^{12}$ independently represents a hydrocarbon group.

2. The optical information recording medium of claim 1, wherein the cyanine dye compound has the following formula (IIA):

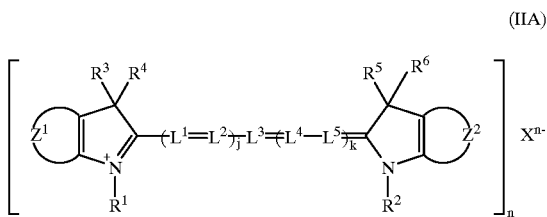

(IIA)

in which each of $Z^1$ and $Z^2$ independently represents an atomic group required for forming an indolenine nucleus or a benzoindolenine nucleus; each of $R^1$ and $R^2$ independently represents an alkyl group or an aryl group; each of $R^3{}_1$, $R^4$, $R^5$ and $R^6$ independently represents an alkyl group; each of $L^1$, $L^2$, $L^3$, $L^4$ and $L^5$ independently represents a methine group which may have a substituent group, and in the case that $L^1$ to $L^5$ have a substituent group, it may be combined with each other to form a ring; j represents an integer of 0, 1 or 2; k represents an integer of 0 or 1; $X^{n-}$ represents an n-valent anion; and n represents an integer of 2 or more.

3. The optical information recording medium of claim 1, wherein n represents an integer of 2 to 4.

4. The optical information recording medium of claim 1, wherein n is 2.

5. The optical information recording medium of claim 1, wherein j is 2 and k is 0, or both of j and k are 1.

6. The optical information recording medium of claim 1, wherein each of $R^{11}$ and $R^{12}$ in the formula (A1) independently represents an alkyl group having 1 to 10 carbon atoms.

7. The optical information recording medium of claim 1, wherein the compound having the formula (A1) or (A2) is present in an amount of 0.5 to 35 wt. %, based on the amount of the cyanine dye compound.

8. The optical information recording medium of claim 1, wherein the recording layer has a thickness in the range of 50 to 300 nm.

9. The optical information recording medium of claim 1, wherein the light-reflecting layer comprises at least one metal selected from the group consisting of Cr, Ni, Pt, Cu, Ag, Au, Al and stainless steel.

10. The optical information recording medium of claim 1, wherein the light-reflecting layer has a thickness in the range of 20 to 500 nm.

* * * * *